US012116828B2

(12) United States Patent
Klein et al.

(10) Patent No.: US 12,116,828 B2
(45) **Date of Patent: *Oct. 15, 2024**

(54) INSULATED WINDOW AND DOOR OPENING ASSEMBLIES WITH HIGH-DENSITY INSULATING CORES

(71) Applicant: QUANTUM HOLDINGS LLC, Everett, WA (US)

(72) Inventors: Jeffrey M. Klein, Snohomish, WA (US); Jeffrey A. Quillen, Granite Falls, WA (US)

(73) Assignee: QUANTUM HOLDINGS LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/364,914

(22) Filed: Aug. 3, 2023

(65) Prior Publication Data

US 2023/0374845 A1 Nov. 23, 2023

Related U.S. Application Data

(63) Continuation of application No. 17/665,397, filed on Feb. 4, 2022, now Pat. No. 11,761,258.

(51) Int. Cl.

| | |
|---|---|
| ***E06B 1/32*** | (2006.01) |
| ***E06B 1/08*** | (2006.01) |
| ***E06B 3/10*** | (2006.01) |
| ***E06B 3/263*** | (2006.01) |

(52) U.S. Cl.
CPC .................. *E06B 1/32* (2013.01); *E06B 1/08* (2013.01); *E06B 3/10* (2013.01); *E06B 3/26345* (2013.01)

(58) Field of Classification Search
CPC ..... E06B 1/06; E06B 1/08; E06B 1/32; E06B 1/325; E06B 1/825; E06B 3/10; E06B 3/163; E06B 3/26345; E06B 3/267; E06B 2003/166; E06B 2003/227; E06B 2003/4446; E06B 2003/4469; E06B 2003/7061; E06B 2003/7063; E06B 2003/226; E06B 2003/261; E06B 5/04
See application file for complete search history.

(56) References Cited

U.S. PATENT DOCUMENTS 4,394,409 A * 7/1983 Hertel ..................... B27B 33/20 52/847
4,503,648 A * 3/1985 Mahaffey ................ E04C 3/127 52/223.7
4,566,234 A * 1/1986 Held ......................... E06B 3/30 49/408
4,720,951 A * 1/1988 Thorn ..................... E06B 3/221 D25/119
4,741,144 A * 5/1988 Graffin .................... E04C 3/292 52/847
(Continued)

FOREIGN PATENT DOCUMENTS

EP 1683925 A1 7/2006
EP 2669460 A1 12/2013
(Continued)

*Primary Examiner* — Kyle J. Walraed-Sullivan
(74) *Attorney, Agent, or Firm* — AEON Law, PLLC; Adam L. K. Philipp; James Namiki

(57) ABSTRACT

Window and door opening assemblies are disclosed herein that incorporate one or more high-density insulation cores and methods for constructing thereof. The high-density insulation cores are comprised of microcellular polyurethane foam.

20 Claims, 11 Drawing Sheets

10a Frame

14a Insulating Member

(56) References Cited

U.S. PATENT DOCUMENTS 4,850,168 A * 7/1989 Thorn .................... B29C 66/54 49/501
4,864,782 A 9/1989 Hasty
4,864,789 A * 9/1989 Thorn .................... E06B 3/86 52/309.9
5,020,292 A * 6/1991 Strom .................... E06B 5/16 428/921
5,207,046 A * 5/1993 Vekkeli .................... B30B 3/04 52/844
5,373,671 A * 12/1994 Roth .................... E06B 3/302 52/208
5,414,962 A * 5/1995 Forbis .................... B29C 66/72523 49/446
5,454,204 A * 10/1995 Jordal .................... E06B 3/267 52/843
5,491,951 A * 2/1996 Riegelman .................... E06B 3/205 52/656.1
5,592,781 A * 1/1997 Mauro .................... E06B 3/44 49/394
5,634,306 A * 6/1997 Riegelman .................... E06B 3/205 52/656.1
5,934,040 A * 8/1999 Chen .................... B29C 66/71 52/801.12
6,427,397 B1 * 8/2002 Kolaschnik .................... E06B 7/14 52/204.54
6,430,889 B1 * 8/2002 Nixon, Sr. .................... E06B 1/32 52/656.5
8,117,802 B1 * 2/2012 Kisch .................... E04C 3/02 52/844
8,728,362 B2 * 5/2014 Knapp .................... B29C 48/916 264/45.9
9,127,498 B1 * 9/2015 Ye .................... E06B 3/5821
9,441,412 B1 * 9/2016 Hooper, Jr. .................... E06B 3/5821
9,938,761 B2 4/2018 Siddiqui et al.
10,107,027 B1 * 10/2018 Weavers .................... E06B 3/08
10,119,328 B2 * 11/2018 Sinnathamby .................... E06B 3/72
10,370,893 B2 * 8/2019 Hooper, Jr. .................... E06B 3/26303
10,400,501 B1 * 9/2019 Tatley .................... E06B 3/06
11,111,717 B1 * 9/2021 Mazur .................... E06B 3/663
11,492,841 B2 * 11/2022 Schleich .................... E06B 3/64
2006/0000173 A1 * 1/2006 Edstrom .................... B44C 5/04 52/313
2006/0272253 A1 * 12/2006 Wolf .................... E06B 3/7001 52/455
2008/0012188 A1 * 1/2008 Dickson .................... F16F 1/3732 267/139
2008/0172956 A1 * 7/2008 Boldt .................... E06B 3/302 52/475.1
2009/0211183 A1 * 8/2009 Kerscher .................... E06B 1/62 52/204.1
2009/0277093 A1 * 11/2009 Over .................... E06B 3/68 49/400
2010/0018139 A1 * 1/2010 Brunnhofer .................... E06B 3/222 52/204.5
2010/0018140 A1 * 1/2010 Brunnhofer .................... E06B 3/26303 52/717.05
2011/0120034 A1 * 5/2011 Melkonian .................... B29C 48/2886 52/204.5
2011/0308180 A1 * 12/2011 Kolzer .................... E06B 3/26345 52/309.4
2014/0186556 A1 * 7/2014 Dear .................... E06B 3/6612 428/34
2015/0096257 A1 4/2015 Sinnathamby et al.
2015/0152678 A1 * 6/2015 Krause .................... E04B 1/665 52/62
2017/0037674 A1 * 2/2017 Hooper .................... E06B 3/263
2017/0120485 A1 * 5/2017 Tzika .................... B29C 44/60
2017/0145735 A1 * 5/2017 Bourassa .................... E06B 3/74
2017/0218681 A1 * 8/2017 Siddiqui .................... E06B 1/325
2019/0078376 A1 * 3/2019 Callaghan .................... E06B 1/70
2019/0162012 A1 * 5/2019 Wang .................... E06B 3/66366
2020/0232268 A1 * 7/2020 Li .................... E06B 1/32
2020/0299962 A1 * 9/2020 Espinosa .................... B32B 3/08
2020/0324451 A1 * 10/2020 Kuster .................... B29C 48/12
2021/0122872 A1 * 4/2021 Hsu .................... C08K 5/0066
2021/0285276 A1 * 9/2021 Sperandio .................... E06B 3/26347
2023/0077647 A1 * 3/2023 Chen .................... H02K 1/12 180/65.6

FOREIGN PATENT DOCUMENTS

GB 2059488 A 4/1981
WO WO-9722779 A1 * 6/1997 .................... E06B 3/221

* cited by examiner

10a Frame

14a Insulating Member

100a Opening Assembly

34a Sash Insulating Member

100e Opening Assembly

100f Opening Assembly 70g window Assembly

100a Opening Assembly

INSULATED WINDOW AND DOOR OPENING ASSEMBLIES WITH HIGH-DENSITY INSULATING CORES

BACKGROUND

1. Field of the Invention

The present invention relates to fenestration of buildings, and more specifically, to window and door structures for buildings.

2. Description of Related Art

In recent years, there has been a drive to make buildings, such as residential homes, multi-family homes, condominiums, and commercial buildings, more energy efficient. One strategy for reaching such a goal is to employ components and features that make windows and doors more energy efficient. For example, one approach is to employ insulating glass units (IGUs) to reduce thermal transfer through glass portions of windows and doors. An IGU is typically comprised of two or more glass panes and an edge seal member that is disposed along the edges of the glass panes that seal the gap, gaps, or airspace between the glass panes so that air or a thermal insulating gas, such as a noble gas (e.g., argon), that is held in the gap, gaps, or airspace is sealed tightly so that no air or gases escape.

Although the incorporation of IGUs has improved thermal efficiencies of at least the glass portions of windows and doors, such solutions do not improve the overall thermal efficiencies of the window or door frame structures that surround the IGUs. For example, window and door assemblies (hereinafter "opening assemblies") are typically comprised of a jamb/frame (hereafter referred to as "frame"), a sash, and glass pane(s) or IGU that are designed to be affixed to a building opening. Both the frame and sash of an opening assembly normally comprises of a number of components, including components that are often elongated (e.g., mullions, bottom and top rails, jambs, tiles, sills, heads, and so forth), as well as additional components having other form factors that can be made from a variety of materials and that are often where thermal heat loss or transfer occurs. In addition to wood, the most common types of materials used to form such components are, for example, aluminum, steel, or synthetics (e.g., PVC, fiberglass, other plastics) due to their strength, durability, and low costs.

One drawback of employing components made of, for example, aluminum, steel, or synthetics is that they are generally not very good thermal insulators. To improve thermal insulating properties of opening assemblies containing such components, insulating foam such as polystyrene and polyurethane foam are sometimes poured or injected into the crevices and voids of the opening assembly and allowed to cure in the crevices and voids. Once cured, these insulating foams can form a low-density insulator with insulating properties that improves the overall insulating properties of the opening assemblies. There are, however, some drawbacks with such low-density insulators. As a direct result of their low density, as well as the inconsistent densities arising from the process of being injected or poured into the frame or sash structure and then cured within those components of the window or door assemblies, these low-density insulators often have weak structural strength and integrity, Because the components of window and door assemblies have structural frames that are made of hard and durable materials such as aluminum, steel, or synthetics, there has not been a need to incorporate into window and door opening assemblies made of aluminum, steel, or synthetics an insulator that has acceptable structural integrity for certain applications.

Traditionally used to form the components of fenestration assemblies (e.g., window or door assembly) is wood. Like opening assemblies made primarily of aluminum, steel, or synthetic components, opening assemblies made of wood components may also have poor thermal insulating characteristics. Unfortunately, using low-density foam insulators for window and door assemblies made primarily of wood components are often not an acceptable solution, since they may not have the structural (tensile, compressive, or torsion) strength and integrity that may be needed for wood window or door assemblies. In addition, there are many situations in which screws or nails are screwed or driven into components of wood window and door assemblies to either affix the assemblies to, for example, a building frame or to affix something to the window and door assemblies. For example, a wood frame for a window or door that supports the window or door and that is placed along the perimeter of a building opening is typically affixed to, for example, the house envelope with nails or screws that are driven or screwed into the wood components of the frame. However, conventional low-density insulating foams may not have sufficient structural integrity to support nails or screws that may be driven into the components of wood window assemblies, particularly if these components are partly made of the same low-density insulating foam used in aluminum, steel, and synthetic window assemblies.

DETAILED DESCRIPTION

Figure 1A:
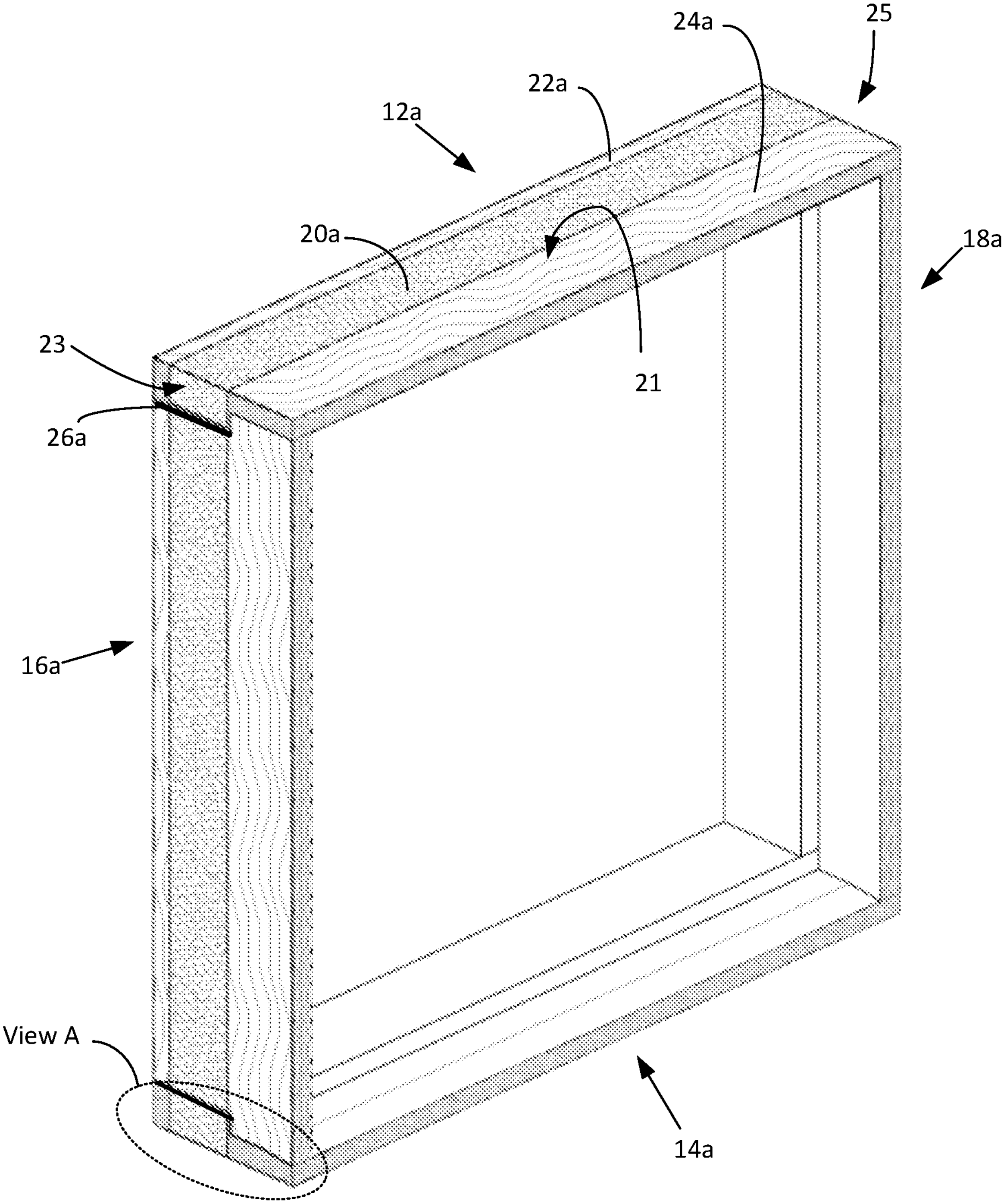
FIG. 1A is a perspective view of an example frame according to some embodiments.

In the present description, certain specific details are set forth in order to provide a thorough understanding of various embodiments of the disclosure. However, upon reviewing this disclosure, one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about," "approximately," and "substantially" are used, they mean0 20% of the indicated range, value, or structure unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

Throughout various portions of the following description, the embodiments of the present disclosure are described in the context of application to specific examples as presented. However, these examples are not intended to be limited unless otherwise expressly stated. As will be understood by one skilled in the art after reviewing this disclosure, various embodiments of the present disclosure may have a wide variety of applications in other contexts and fields.

The drawings submitted herewith include example information depicted for illustrative purposes and are not intended to be limiting unless otherwise indicated.

According to various embodiments of the present disclosure, window and door assemblies (hereinafter window or door opening assemblies or simply "opening assemblies") of building openings are disclosed herein that include one or more insulating members with high-density insulating cores having high structural strength, integrity, and excellent insulating properties. For these embodiments, an opening assembly may include a door or window, which will be referred to herein as a "sash structure," and a frame, which is the supporting structure that supports, for example, the sash structure (e.g., a door or a window), and that is designed to be affixed along the perimeter of a building opening. As one of ordinary skill in the art will recognize, the sash structure may be attached to the frame by various means including, for example, hinges, hardware, screws, and so forth.

According to various embodiments, the sash structure and the frame of an opening assembly may each include one or more "insulating members" with high-density insulating cores that are at least partially encased in one or more wood components. In some cases, an insulating member may be an elongated wood member with a high-density (HD) insulating core that is at least partially covered longitudinally by one or more wood components and that may extend longitudinally from one end to the opposite end of the insulating member. That is, typically in both the sash structures (e.g., windows and doors) and the frames of opening assemblies for wood windows and doors, there may be one or more elongated wood members such as mullions, bottom and top rails, jambs, stiles, sills, heads, and so forth that are commonly situated along the perimeters (e.g., just inside the perimeters) of the sash structures and frames. According to various embodiments, at least some of these elongated wood members may include the HD insulating cores to form the insulating members. In various embodiments, one or more of these insulating members may be incorporated into the sash structure and/or frame of a door or window opening assembly and that may encircle one or more glass panes of the door or window opening assembly.

The HD insulating core that may be incorporated into one or more wood members to form one or more "insulating" wood members of opening assemblies according to various embodiments may be an HD polyurethane core with a uniform density that in some cases does not deviate by greater than ten percent throughout the core. For example, in some cases, the HD polyurethane core may be an HD microcellular polyurethane foam with a highly uniform cellular structure such as the FR-4600 series of foam produced by General Plastics Manufacturing Company of Tacoma, Washington.

In order to produce an insulating member with a uniformly dense HD polyurethane core, the HD polyurethane core may be cured and set prior to being incorporated into wood members of window and door opening assemblies. Conversely, when low-density insulating foam such as polystyrene and conventional polyurethane foams are employed in window and door assemblies to act as insulators, these foams are often poured or injected into the voids and crevices of components of such assemblies and then cured within the voids and crevices of the components of the window and door assemblies. Unfortunately, the cured low-density insulating foam produced by this approach will result in the formation of an uneven and low-density insulating foam. As a result, the cured insulating foam will have relatively low structural integrity and strength, which may not be acceptable for use in wood components of wood window and door structures since such insulating foam will need to have sufficient structural integrity to meet fenestration requirements.

One conventional solution to using low-density insulators, such as low-density polystyrene or polyurethane that does not have good structural integrity, is to use the low-density insulator in combination with another substance having high density and high structural integrity. For example, using a combination of a layer of low-density insulator (e.g., low-density polyurethane or polystyrene) with a layer of high-density, high-structural integrity material (e.g., PVC, high-density polystyrene, high-density polyurethane) may not provide an adequate solution since the transition between the low-density and high-density materials may form a transition boundary where the structural integrity may be compromised (e.g., a weak point). Further, because opening assemblies (e.g., windows and doors and their frames) are typically installed by homebuilders/contractors into building openings, the installers may not know where either the high-density material or the low-density insulating foam starts and ends within the enclosed opening assembly when they are installing the opening assembly. This is a problem particularly for wood window and door frames since builders/contractors install the window and door opening assemblies by screwing or driving a screw or nail into different parts of the opening assembly using different size screws and nails, depending on the application. If the proper sized screw or nail is not used in a proper way during installation of a window or door opening assembly having different layers of both high and low-density material/insulators, the installation of the opening assembly could fail. That is, using layers of different materials with different densities, at best, makes the installation of wood windows and doors more difficult and dangerous.

According to various embodiments, to address these issues, highly and uniformly dense polyurethane cores with high insulating properties are employed in opening assemblies. To produce insulating polyurethane cores with high and uniform densities in some embodiments, high-density (HD) insulating polyurethane cores may be formed and cured prior to being at least partially encased in, for example, wood components. In some embodiments, and contrary to some conventional approaches, the HD insulating polyurethane cores may not be mated or affixed to a low-density insulating foam, such as low-density polystyrene or polyurethane foam (e.g., a low-density polyurethane foam that has a density less than the HD polyurethane cores such as a polyurethane foam having a density of less than 10 pounds per cubic foot) since the mating of an HD insulating polyurethane core to a low-density insulating foam may create a structural weak point.

In various embodiments, an HD polyurethane core may be at least partially encased by one or more wood components on at least two opposing sides of the HD polyurethane core to form an insulating member. For example, if the HD polyurethane core has an elongated, cuboid shape with four longitudinal sides and two opposing end sides that are transversely situated relative to the four longitudinal sides, then one or more wood components may cover three or all four longitudinal sides of the elongated, cuboid-shaped, HD polyurethane core to form an insulating member. As a result, at least opposing longitudinal sides of the elongated cuboid-shaped HD polyurethane core may be encased by the one or more wood components. Note that in other embodiments, the HD polyurethane core may have other types of shapes (e.g., a curved or arched shape) other than an elongated cuboid shape as will be further described herein.

In various embodiments, one or more insulating members, each with an HD insulating polyurethane core, may be situated along the perimeter of a frame. For example, a frame for a rectangular door may have a rectangular shape that frames the outline of the rectangular door. As a result, the one or more HD insulating cores of the one or more insulating members that are situated along the perimeter of the rectangular frame will form a rectangular HD insulating polyurethane core that may encircle the sash structure (e.g., window or door) that the frame may support.

In various embodiments, four linear or straight elongated insulating members with HD insulating cores may be placed on the four sides of the rectangular-shaped frame as will be illustrated herein. In still other cases, two L-shaped insulating members may be used to form the rectangular-shaped frame. Similar strategies using one or more elongated insulating members with high-density insulating cores (e.g., using a single elongated insulating member, using multiple straight elongated insulating members, and so forth) may be used for improving the insulating properties of a sash structure (e.g., the window or door portion of an opening assembly). Note that for purposes of this description the term "insulating member" or "insulating members" may be in reference to a member or members that may have a variety of shape types in addition to the elongated shapes illustrated in the figures. For example, in alternative embodiments, an insulating member with a high-density insulating core may have a variety of non-elongated shapes such as cube, torus, triangular prism, and so forth.

In various embodiments, the high-density (HD) polyurethane core of each of the one or more insulating members of a window or door opening assembly may have a uniform density of polyurethane that does not deviate by greater than ten percent in density throughout the core as described above. In one embodiment, the HD polyurethane core of each of the one or more insulating members may have a density of 10 to 50 pounds per cubic foot. In another embodiment, the HD polyurethane core of each of the one or more insulating members may have a density of 20 to 30 pounds per cubic foot. In yet another embodiment, the HD polyurethane core of each of the one or more insulating members may have an average density of 25 pounds per cubic foot.

In various embodiments, the HD polyurethane core may be made of microcellular polyurethane foam having a highly dense uniform structure with gas bubbles that are less than 50 microns in size.

In some embodiments, the HD polyurethane core of one or more insulating members of a window or door opening assembly may have a compressive strength of 300 to 5000 pounds per square inch (psi), a tensile strength of 260 to 4000 psi, a flexural strength of 380 to 6000 psi, and coefficient of thermal expansion (CTE) of $29\times10-6/K$. In various embodiments, the HD polyurethane cores that may be employed may have, in addition to high structural integrity, high insulating properties such as, for example, having an R-value of between 1.0 and 7.5 for one-inch thickness. In some embodiments, the HD polyurethane cores may have an R-value of between 2.00 and 4.40 for one-inch thickness. In some embodiments, the HD polyurethane cores may have an R-value of approximately 2.42 for one-inch thickness.

Referring to FIG. 1A, which is a perspective view of an example window frame (hereinafter simply "frame 10*a*") according to various embodiments. For these embodiments, frame 10*a* may be affixed to a perimeter of a window opening for a building, such as a residential home or commercial building, and may be part of a window opening assembly (see, for example, opening assembly 100*a* of FIG. 1C). The frame 10*a* includes four insulating members 12*a*, 14*a*, 16*a*, and 18*a* that are elongated components and that may be affixed to each other, via adhesive or glue or by other means, in a manner that forms a rectangular frame. In various embodiments, each insulating member 12*a*, 14*a*, 16*a*, and 18*a* includes an HD insulating core and three wood components that are affixed to three sides of the HD insulating core. For example, the insulating member 12*a* that is disposed at the top of the rectangular frame 10*a* includes an HD insulating core 20*a* with an elongated cuboid shape, a first wood component 22*a*, a second wood component 24*a*, and a third wood component 26*a* (which is a thin profile wood component affixed to the underside of the HD insulating core 20*a* in FIG. 1A). In this embodiment, the first wood component 22*a*, the second wood component 24*a*, and the third wood component 26*a* are on three of four longitudinal sides of the HD insulating core 20*a*. In FIG. 1A, only one of the longitudinal sides, longitudinal side 21 that is not covered by a wood component, is visible. Longitudinal side 21 defines a portion of an outer surface for frame 10*a*. The HD insulating cores for each of the other three insulating members 14*a*, 16*a*, and 18*a* may also have an elongated cuboid shape, where one of the four longitudinal sides of each of the HD insulating cores for each of the other three insulating members 14*a*, 16*a*, and 18*a* may be at least a portion of an outer surface for the frame 10*a*. In various embodiments, the outer surface for the frame 10*a* may be affixed to the perimeter of a window opening for a building, such as being affixed to a house frame by screw or nail, or by other means as illustrated in FIG. 2B.

In various embodiments, the HD insulating core of each of the insulating members 12*a*, 14*a*, 16*a*, and 18*a* may extend longitudinally from one end side to the opposite end side of the insulating members 12*a*, 14*a*, 16*a*, and 18*a*. For example, in FIG. 1A, the HD insulating core 20*a* of insulating member 12*a* may extend from end side 23 of the insulating member 12*a* to the opposite end side 25 of the insulating member 12*a*. Each insulating member 12*a*, 14*a*, 16*a*, and 18*a* may be affixed to two of the other insulating members 12*a*, 14*a*, 16*a*, and 18*a*. In the implementation illustrated in FIG. 1A, each insulating member 12*a*, 14*a*, 16*a*, and 18*a* is straight and affixed at right angles to two of the other insulating members 12*a*, 14*a*, 16*a*, and 18*a*. In alternative embodiments, each of the insulating members 12*a*, 14*a*, 16*a*, and 18*a* may be attached to two of the other insulating members 12*a*, 14*a*, 16*a*, and 18*a* at different angles when the window, for example, has a trapezoid or some other shape type. Because the HD insulating core of each of the insulating members 12*a*, 14*a*, 16*a*, and 18*a* may extend longitudinally from one end to the opposite end of the insulating members 12*a*, 14*a*, 16*a*, and 18*a*, the HD insulating cores of the insulating members 12*a*, 14*a*, 16*a*, and 18*a*, in combination, may form a rectangular HD insulating core along the perimeter of the frame 10*a*, optimizing the insulating properties of the frame 10*a*.

In some embodiments, a portion of the insulating members 12*a*, 14*a*, 16*a*, and 18*a* may be replaced by wood members or other types of members without the HD insulating core described above.

Figure 1B:
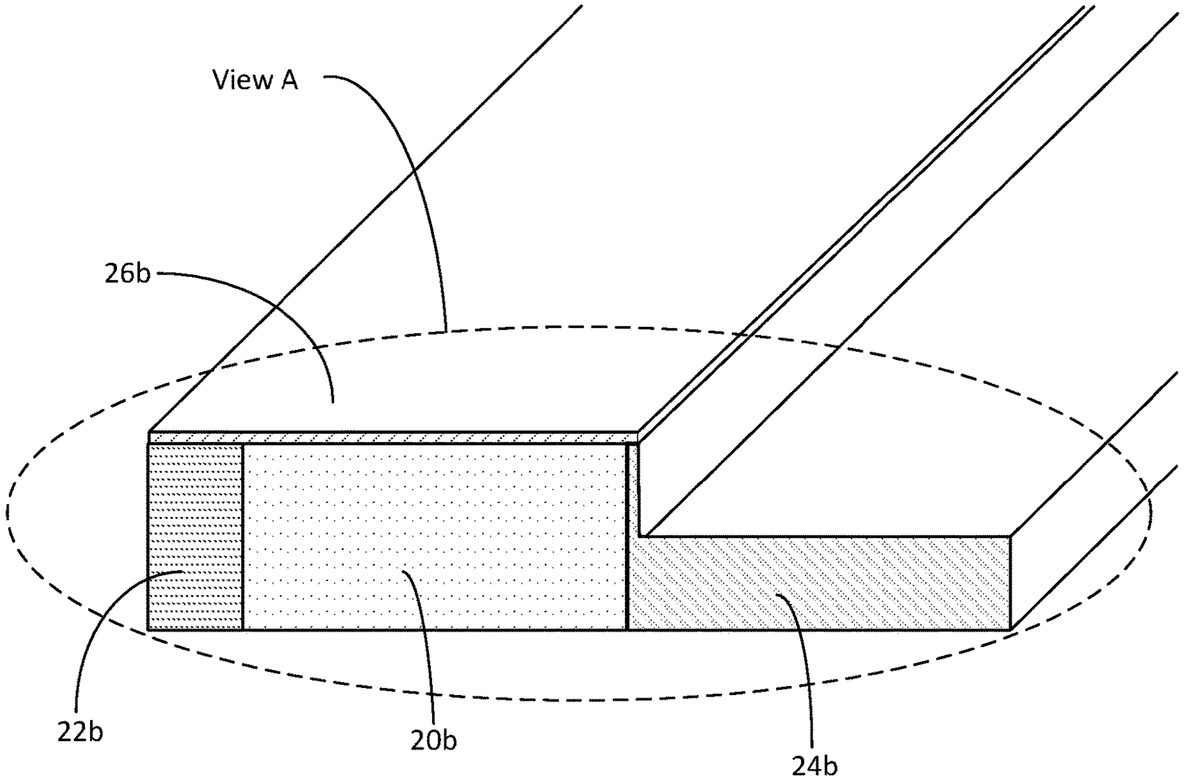
FIG. 1B is a close-up view of view A of an insulating member of the frame illustrated in FIG. 1A and isolated from the other components of the frame.

FIG. 1B shows a close-up view A of the insulating member 14*a* of FIG. 1A isolated from the other components of frame 10*a*. As illustrated, insulating member 14*a* includes an HD insulating core 20*b* and three wood components (e.g., a first wood component 22*b*, a second wood component 24*b*, and a third wood component 26*b*) that extend the longitudinal length of the insulating member 14*a* and that are affixed to three of the four longitudinal sides of the HD insulating core 20*b*. Note that the third wood component 26*b*, as illustrated, may be a thin profile wood component, such as a wood veneer, that mirrors the third wood component 26*a* of the insulating member 12*a* of FIG. 1A. Various means may be employed to affix the first wood component 22*b*, the second wood component 24*b*, and the third wood component 26*b* to the HD insulating core 20*b*, including, for example, using an adhesive such as a glue, or other means. Note that when the four insulating members 12*a*, 14*a*, 16*a*, and 18*a* in FIG. 1A are assembled to form the rectangular frame 10*a*, only portions of the thin wood component (e.g., the third wood component 26*a* of the insulating member 12*a* of FIG. 1A and the third wood component 26*b* of the insulating member 14*a* of FIG. 1B) on the interior side of each insulating member 12*a*, 14*a*, 16*a*, and 18*a* prevents the HD insulating cores of the four insulating members 12*a*, 14*a*, 16*a*, and 18*a* from forming a complete/continuous rectangular HD insulating core frame without any gaps or breaks. For example, in FIG. 1B, the reference line for reference number 26*b* touches a portion of the third wood component 26*b* that will be positioned between the HD insulating core 20*b* of insulating member 14*a* and the HD insulating core (not illustrated) of insulating member 16*a* when the end of the insulating member 16*a* is affixed to the insulating member 14*a*. As a result, the HD insulating core of insulating member 16*a* is not in direct contact with the HD insulating core 20*b* of insulating member 16*a*. However, in alternative embodiments, those portions of the thin wood components on the interior sides of each of the insulating members 12*a*, 14*a*, 16*a*, and 18*a* may be removed or omitted so that an HD insulating core frame formed by the HD insulating cores of the insulating members 12*a*, 14*a*, 16*a*, and 18*a* is a continuous HD insulating core frame without any gaps.

Although FIG. 1B shows the first wood component 22*b*, the second wood component 24*b*, and the third wood component 26*b* as being separate components that are separately or individually affixed to the HD insulating core 20*b*, in alternative embodiments, the first wood component 22*b*, the second wood component 24*b*, and the third wood component 26*b* may be a single unitary component. In still other embodiments, only two of the three wood components (e.g., the first wood component 22*b*, the second wood component 24*b*, and the third wood component 26*b*) may be a unitary component.

Figure 1C:
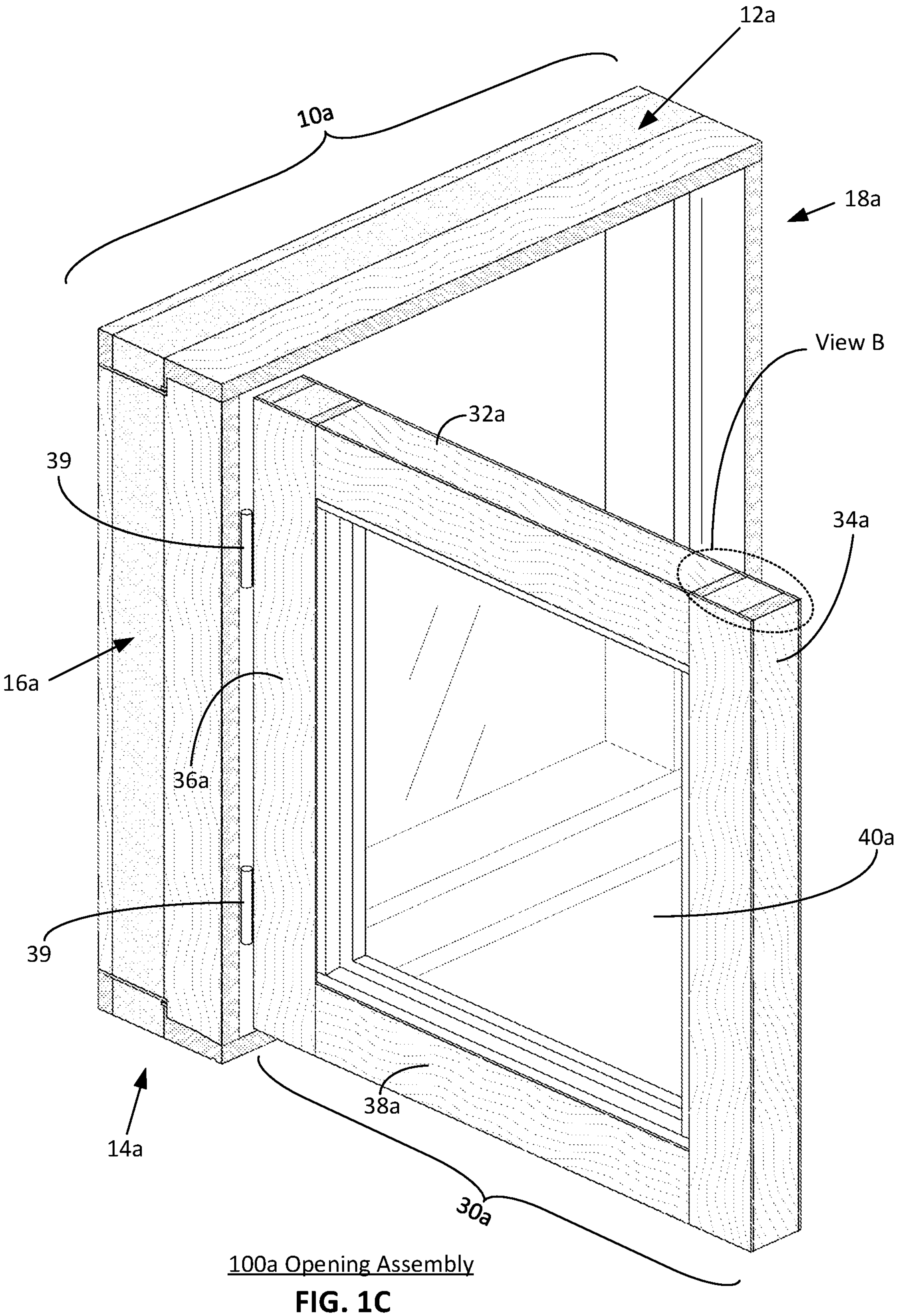
FIG. 1C is a perspective view of an example window opening assembly according to some embodiments.

FIG. 1C is a perspective view of an example window opening assembly according to various embodiments. For these embodiments, the window opening assembly (hereinafter simply "opening assembly 100*a*") includes the frame 10*a* illustrated in FIG. 1A, and a sash structure 30*a* that is supported by the frame 10*a*. In this embodiment, the sash structure 30*a* is essentially the window portion of the opening assembly 100*a* that opens via, for example, two hinges 39 by swinging away from the frame 10*a*. Note that conventionally the opening assembly 100*a* is sometimes referred to as a casement window.

As illustrated in FIG. 1C, the sash structure 30*a* includes four sash insulating members 32*a*, 34*a*, 36*a*, and 38*a* that are disposed along the perimeter of multiple glass panes 40*a* and that act as a frame to hold glass panes 40*a* that in some cases may be part of an insulating glass unit (IGU). Note that in alternative embodiments, only a single glass pane 40*a* may be framed by the sash insulating members 32*a*, 34*a*, 36*a*, and 38*a*. The sash insulating members 32*a*, 34*a*, 36*a*, and 38*a* may each include an HD insulating core having the same or similar characteristics as the HD insulating cores (e.g., HD polyurethane cores) included in the insulating members 12*a*, 14*a*, 16*a*, and 18*a* of frame 10*a*. In alternative embodiments, however, one or more of the sash insulating members 32*a*, 34*a*, 36*a*, and 38*a* may be replaced by wood members or other types of members without the above-described HD insulating core.

Figure 1D:
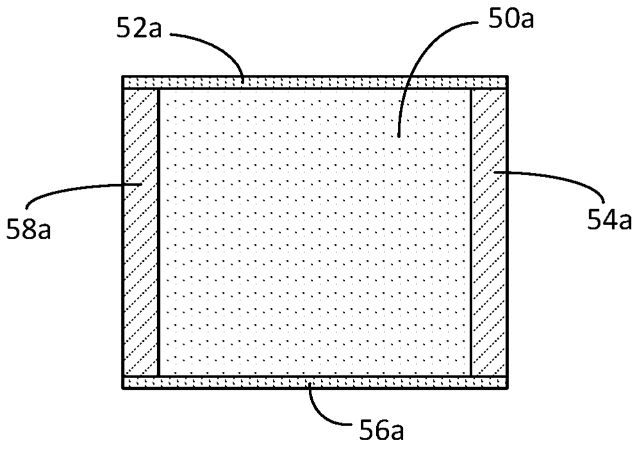
FIG. 1D is a close-up view of an end of a sash insulating member in view B of FIG. 1C.

Referring to FIG. 1D, which shows a close-up view of one of the ends of sash insulating member 34*a* in view B of FIG. 1C. Sash insulating member 34*a* includes an HD insulating core 50*a*, and wood components 52*a*, 54*a*, 56*a*, and 58*a*. As illustrated in FIGS. 1C and 1D, sash insulating member 34*a* has an elongated cuboid shape with four longitudinal sides and two end sides that are opposite from each other. The HD insulating core 50*a* extends longitudinally from one end of the sash insulating member 34*a* to the other end of the sash insulating member 34*a*. Each of the other sash insulating members 32*a*, 36*a*, and 38*a* may also have an HD insulating core that extends the entire longitudinal lengths of the sash insulating members 32*a*, 36*a*, and 38*a*. Thus, when the sash insulating members 32*a*, 34*a*, 36*a*, and 38*a* are arranged as an outline of a rectangular shape, such as in FIG. 1C, the HD insulating cores (e.g., high-density polyurethane cores) of the sash insulating members 32*a*, 34*a*, 36*a*, and 38*a*, in combination, form a rectangular HD insulating core substantially encircling, with minimal gaps or disruptions, the perimeter of the glass pane(s) 40*a*, ensuring that the overall thermal insulating properties of the sash structure 30*a* as well as the opening assembly 100*a*, is optimized. Thus, once the window sash structure 30*a* is in the closed position, the HD insulating cores of the sash insulating members 32*a*, 34*a*, 36*a*, and 38*a* and the HD insulating cores of the insulating members 12*a*, 14*a*, 16*a*, and 18*a* of the frame 10*a*, form two complementary rectangular HD insulating core frames that when the insulating glass unit (IGU) or the glass pane(s) is installed in the sash assembly, encircles the glass pane or panes 40*a*. For example, the rectangular insulating core frame formed by the HD insulating cores of the sash insulating members 32*a*, 34*a*, 36*a*, and 38*a* of the sash structure 30*a* which encircles the glass pane(s) 40*a* may be smaller (e.g., smaller in terms of width and length) than the rectangular insulating core frame formed by the HD insulating cores of the insulating members 12*a*, 14*a*, 16*a*, and 18*a* of the frame 10*a*. These two rectangular insulating core frames may be wider and longer than the glass pane(s) 40*a* and may complement each other to significantly reduce thermal transfer along the perimeter of the glass pane(s) 40*a* when the sash structure 30*a* is closed.

Note that unlike the insulating members 12*a*, 14*a*, 16*a*, and 18*a* of the frame 10*a*, there may be wood components on all four longitudinal sides of the cuboid-shaped HD insulating cores of each of the sash insulating members 32*a*, 34*a*, 36*a*, and 38*a*. For example, in FIG. 1D there are four wood components 52*a*, 54*a*, 56*a*, and 58*a* on each of the longitudinal sides of the cuboid-shaped HD insulating core 50*a* of sash insulating member 34*a* of FIG. 1C. In some alternative embodiments, one or more of the sash insulating members 32*a*, 34*a*, 36*a*, and 38*a* with the HD insulating cores may be replaced with wood or other types of members without the HD insulating core described above.

Figure 1E:
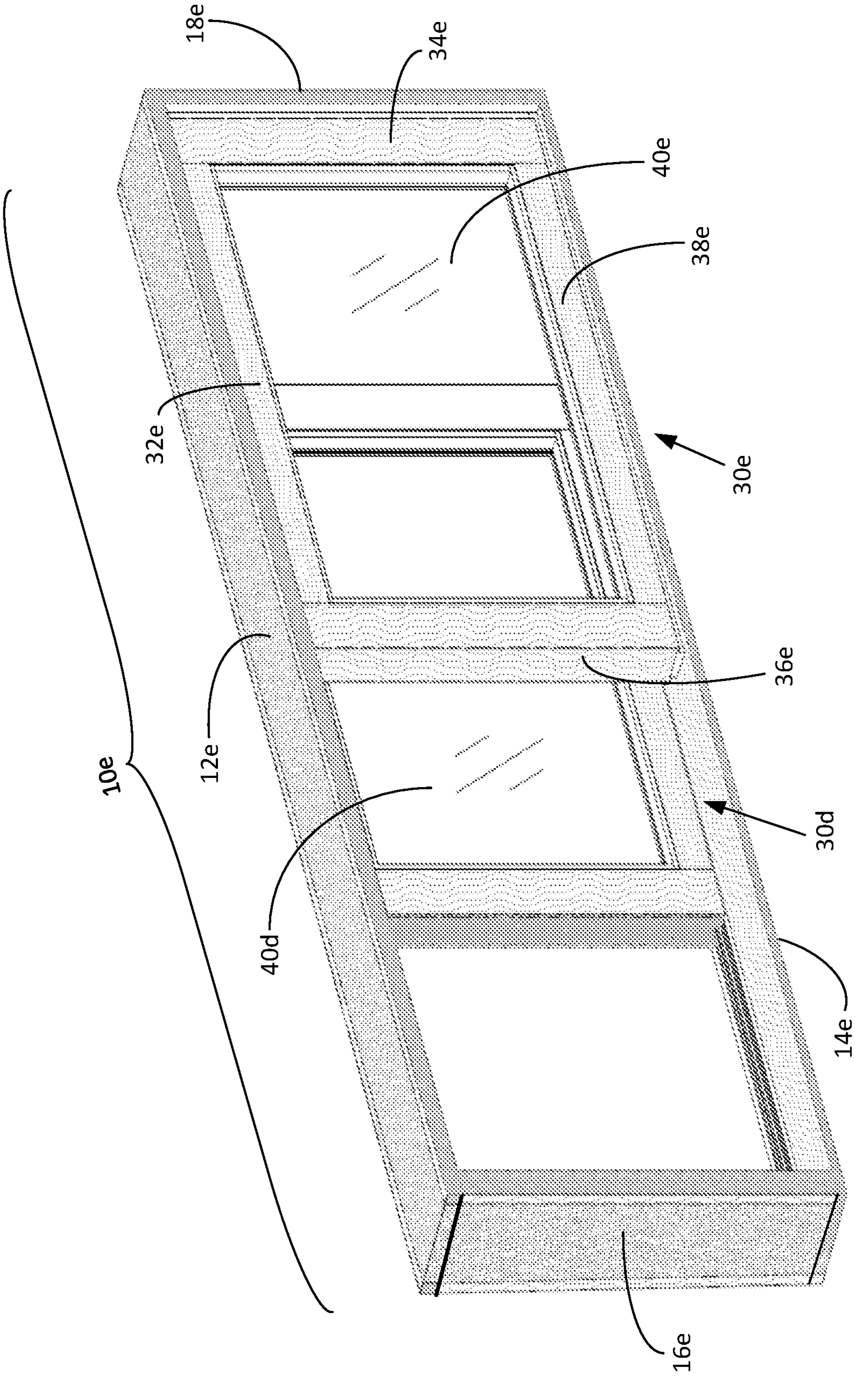
FIG. 1E is a perspective view of another example window opening assembly according to some embodiments.

As will be further described and illustrated herein, the HD insulating cores described above may be incorporated into various components of a variety of window and door opening assemblies to improve the thermal insulating properties of the window and door opening assemblies. That is, in various embodiments, the insulating members that incorporate the HD insulating core may have a variety of form factors and may be incorporated into various types of window and door structures. For example, FIG. 1E illustrates an example of another window opening assembly (herein simply "opening assembly 100*e*") that may incorporate the HD insulating cores (e.g., high-density polyurethane cores) described above. The opening assembly 100*e* includes a frame 10*e* that is comprised of four insulating members 12*e*, 14*e*, 16*e*, and 18*e*, similar to the frame 10*a* of FIGS. 1A and 1C, and two sash structures 30*d* and 30*e* (e.g., two windows), each sash structure 30*d* and 30*e* having a set of one or more glass panes 40*d* and 40*e*, respectively, that are framed or bordered by four sash insulating members.

Each sash structure 30*d* and 30*e* represents the window portions of the window opening assembly 100*e*. Note that the right half of the sash structure 30*d* is behind sash structure 30*e*. Sash structure 30*e* is a stationary window that does not open or move, while sash structure 30*d* is an operable window that can slide laterally. Each sash structure 30*d* and 30*e* includes four sash insulating members that form the frames of the sash structures 30*d* and 30*e*, similar to the sash structure 30*a* (which has sash insulating members 32*a*, 34*a*, 36*a*, and 38*a*) of FIG. 1C. For example, sash structure 30*e* includes sash insulating members 32*e*, 34*e*, 36*e*, and 38*e* that may incorporate the HD insulating core described above. Further, the HD insulating cores of sash insulating members 32*e*, 34*e*, 36*e*, and 38*e* may longitudinally extend the entire lengths of the sash insulating members 32*e*, 34*e*, 36*e*, and 38*e*. In some embodiments, one or more of the sash insulating members 32*e*, 34*e*, 36*e*, and 38*e* may be replaced by one or more wood or other types of members without the HD insulating core described above. For example, they may be substituted with one or more insulating members having a polystyrene or polyisocyanurate core.

Similarly, the four sash insulating members of sash structure 30*d* (three of the four sash insulating members are visible in FIG. 1E) may also incorporate the HD insulating cores. In various embodiments, each sash structure 30*d* and 30*e* includes a set of one or more glass panes 40*d* and 40*e* (e.g., a set of one or more glass panes 40*d* and a set of one or more glass panes 40*e*) that are framed or held by the sash insulating members of the sash structure 30*d* and 30*e* (e.g., sash insulating members 32*e*, 34*e*, 36*e*, and 38*e* of sash structure 30*e* in FIG. 1E). In some embodiments, each set of one or more glass panes 40*d* and 40*e* may be part of an IGU.

Figure 1F:
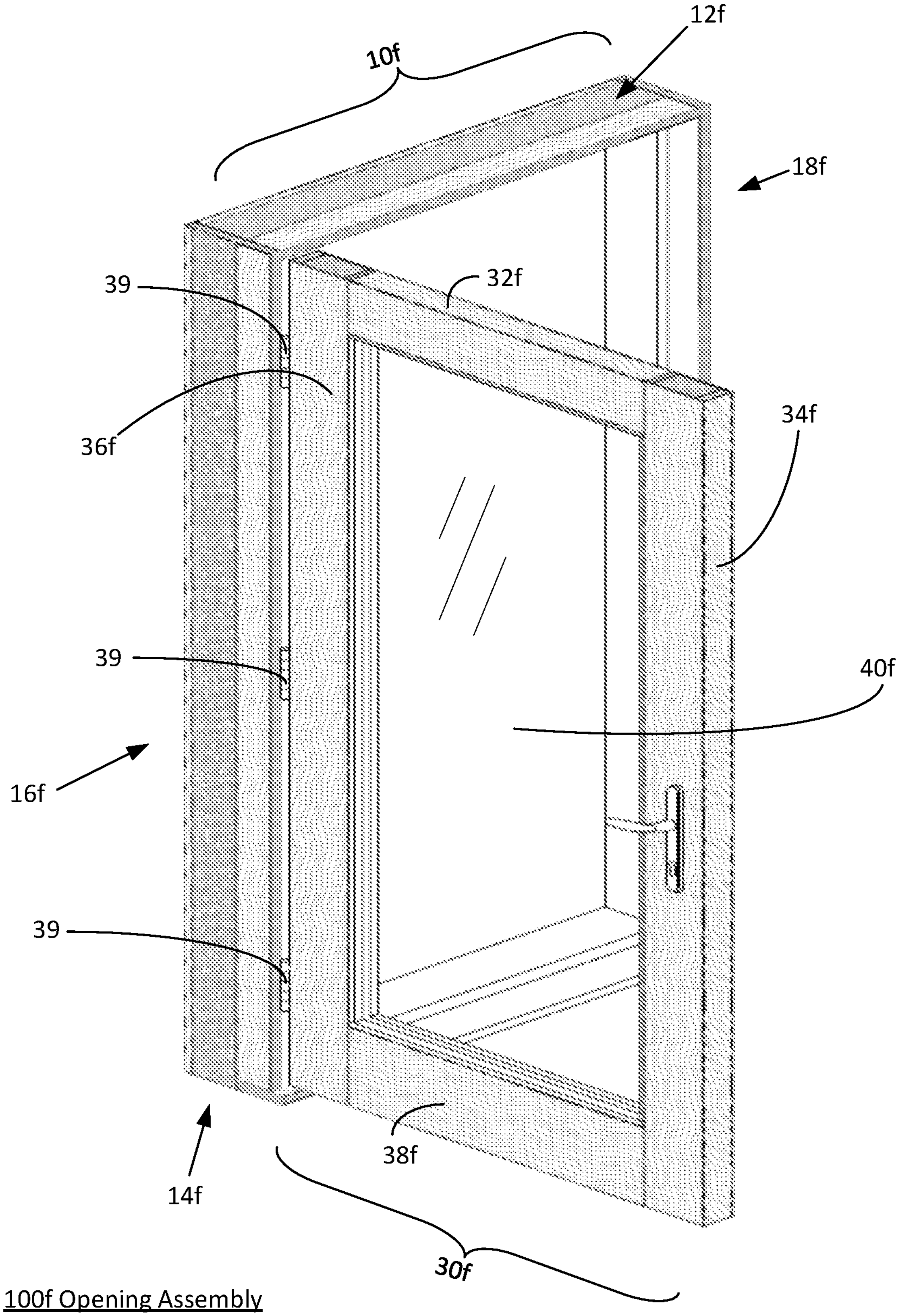
FIG. 1F is a perspective view of an example door opening assembly according to some embodiments.

Referring now to FIG. 1F, which illustrates an example door opening assembly that may incorporate one or more HD insulating cores according to various embodiments. Similar to the window opening assembly 100*a* of FIG. 1C, the door opening assembly (hereinafter simply "opening assembly 100*f*") includes a frame 10*f* and a sash structure 30*f* (e.g., a door that is attached to the frame 10*f* by hinges 39). The frame 10*f* and the sash structure 30*f* may each include four insulating members that may each include an HD insulating core, similar to the insulating members with the HD insulating core described above with respect to the frame 10*a* and the sash structure 30*a* of FIG. 1C. For example, and as illustrated in FIG. 1F, the frame 10*f* includes four elongated insulating members 12*f*, 14*f*, 16*f*, and 18*f* that may incorporate an HD polyurethane core as described above.

Similarly, the sash structure 30*f* may include four sash insulating members 32*f*, 34*f*, 36*f*, and 38*f* (with the HD polyurethane core) that frame or hold a set of one or more glass panes 40*f*. In some embodiments, the set of one or more glass panes 40*f* may include multiple glass panes and may be part of an insulating glass unit (IGU).

The incorporation of the HD polyurethane cores in the elongated components of both window and door opening assemblies, such as the sash insulating members 32*f*, 34*f*, 36*f*, and 38*f* of the sash structure 30*f* and the insulating members 12*f*, 14*f*, 16*f*, and 18*f* of the frame 10*f* for the door opening assembly 100*f* of FIG. 1F, ensures that thermal loss/transfer through peripheral portions of window and door opening assemblies may be greatly minimized in various embodiments. Further, because of the high strength and the uniformity of the HD polyurethane cores, the inclusion of such insulating cores in window and door opening assemblies does not interfere or hinder, for example, the successful installation of the window and door opening assemblies in building openings even when the window or door installers (e.g., home builders) are using different sized nails or screws in different ways.

Figure 2A:
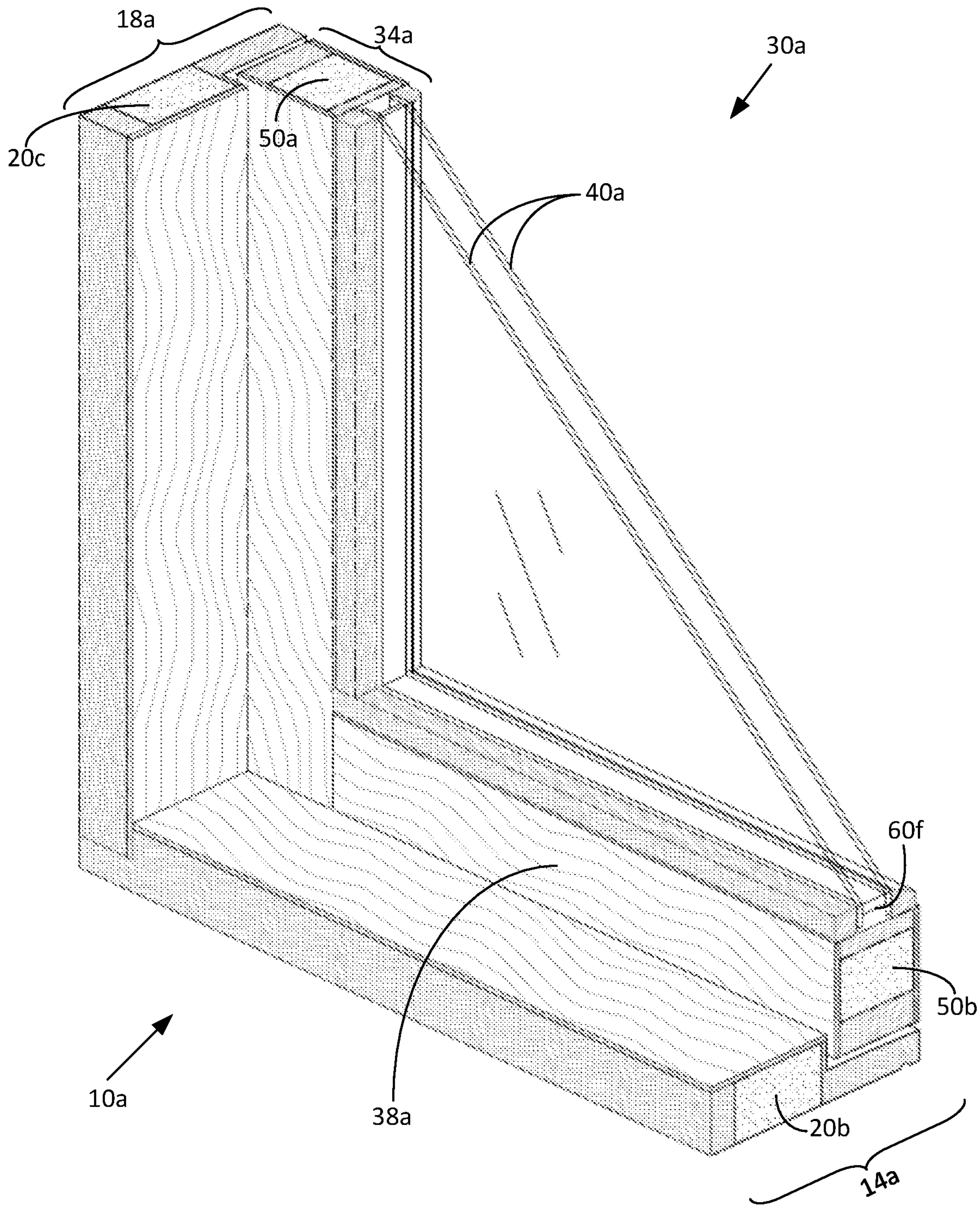
FIG. 2A illustrates a cutaway view of a corner portion of an opening assembly illustrated in FIG. 1C when the sash structure of the opening assembly is in the closed position according to some embodiments.
Figure 2B:
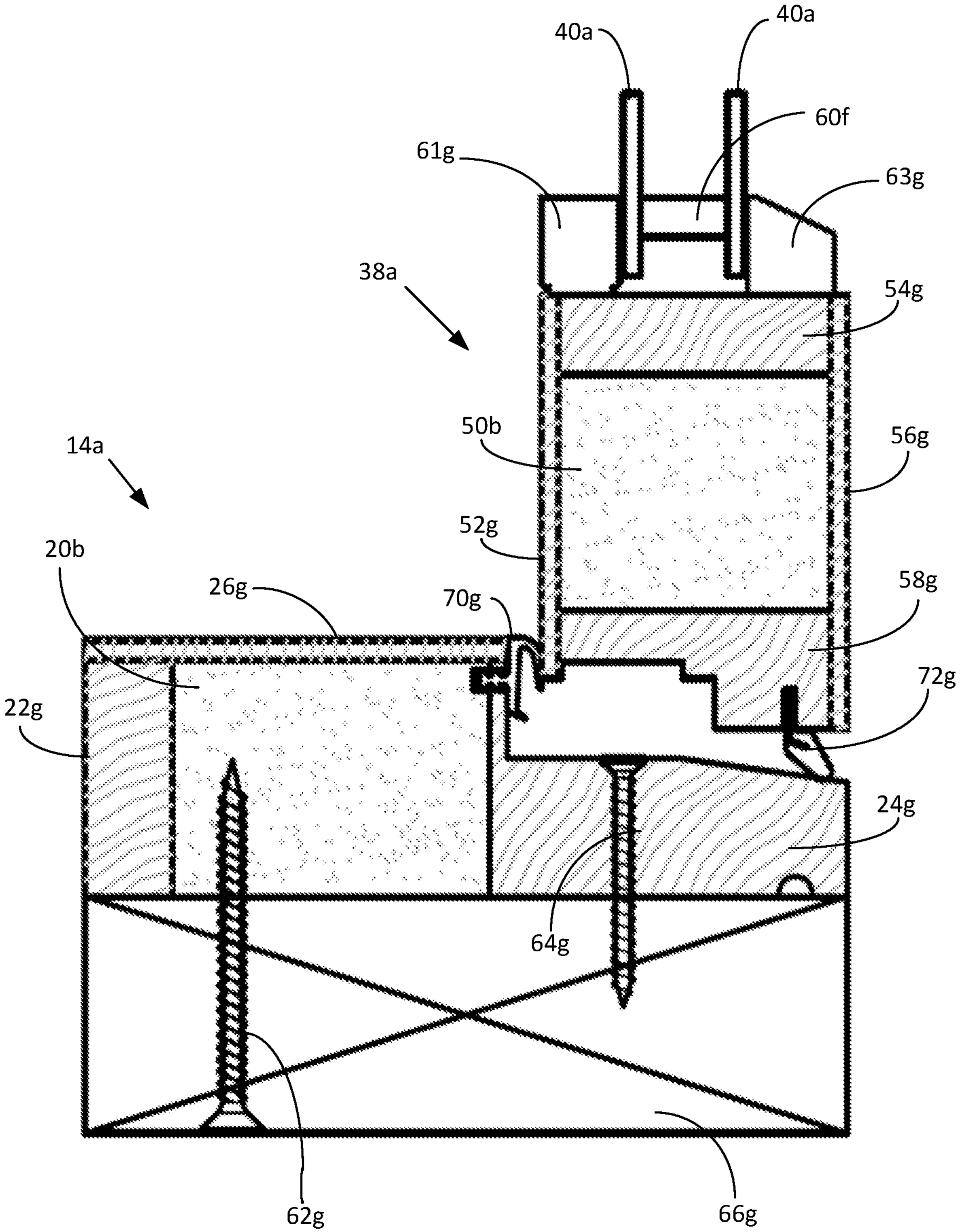
FIG. 2B is a cross-sectional view of a portion of the opening assembly illustrated in FIGS. 1C and 2A according to some embodiments.

FIG. 2A is a cutaway view of a corner portion of the opening assembly 100*a* of FIG. 1C in accordance with various embodiments. In particular, FIG. 2A illustrates a cutaway view of a corner portion of the opening assembly 100*a* when the sash structure 30*a* (e.g., window) is in the closed or shut position. In FIG. 2A, one of the corners of the sash structure 30*a*, which is comprised of sash insulating members 34*a* and 38*a*, is positioned flush against a side of one of the corners of the frame 10*a*, which is comprised of insulating members 14*a* and 18*a*. The sash structure 30*a* includes a pair of glass panes 40*a* that may be part of an insulated glass unit (IGU). In an IGU, a gas, such as a noble gas or air, may be trapped in the gap between the two glass panes 40*a*. The gap may be sealed by the two glass panes 40*a* and an edge sealing member 60*f* that are disposed between the two glass panes 40*a* just inside the outer perimeters of the two glass panes 40*a*. In various embodiments, the edge sealing member 60*f* may be comprised of components such as spacers, desiccant, sealant, and so forth.

Incorporated into each of the insulating members 14*a* and 18*a* of frame 10*a* in FIG. 2A are HD insulating cores 20*b* and 20*c*, respectively. Similarly incorporated into each sash insulating members 34*a* and 38*a* of sash structure 30*a* are HD insulating cores 50*a* and 50*b*, respectively. Each of these HD insulating cores 20*b*, 20*c*, 50*a*, and 50*b* extends the entire longitudinal lengths of their respective insulating member. Because all the HD insulating cores of all the insulating members of both the frame 10*a* and the sash structure 30*a* may extend the entire longitudinal length of their respective insulating member, the four HD insulating cores of the frame 10*a* and the four HD insulating cores of the sash structure 30*a* may form two sets of insulating cores that encircle the perimeter of the glass panes 40*a* (note that although two glass panes 40*a* are illustrated in FIG. 2A, in alternative embodiments, the two sets of insulating cores may encircle the perimeter of a single glass pane or three or more glass panes). As a result, the two rectangular insulating core configurations formed by the two sets of HD insulating cores of the frame 10*a* and the sash structure 30*a* may complementarily reduce the thermal heat transfer through the opening assembly 100*a*. That is, the rectangular insulating core configuration formed by the four HD insulating cores of the frame 10*a* is slightly bigger than the rectangular insulating core configuration formed by the four HD insulating cores of the sash structure 30*a* of the opening assembly 100*a* of FIG. 1C. As a result, the two rectangular core configurations that are formed may complement each other in improving the insulating properties around the perimeter of the glass pane(s) 40*a*.

FIG. 2B is a cross-sectional view of a portion of the opening assembly 100*a* of FIGS. 1C and 2A according to some embodiments. In particular, FIG. 2B illustrates a cross-sectional view of the insulating member 14*a*, the sash insulating member 38*a*, and the glass panes 40*a* illustrated in FIG. 2A when the sash structure 30*a* (e.g., window) is in the closed position. The two glass panes 40*a*, which along with the edge sealing member 60*f* may make up an IGU, may be held in the sash structure 30*a* by stick 61*g* on one side, and a stop 63*g* on the opposite side. In various embodiments, the stick 61*g* and the stop 63*g* may be made of wood or other materials. In some embodiments, the stick 61*g* and the wood component 54*g* of the sash insulating member 38*a* may be a unitary piece/member. Note that although two glass panes 40*a* are illustrated in FIGS. 2A and 2B, in alternative embodiments, fewer or more glass panes 40*a* may be held by the sash structure 20*a*.

The sash insulating member 38*a*, as illustrated in FIG. 2B, may include the HD insulating core 50*b*, and wood components 52*g*, 54*g*, 56*g*, and 58*g* situated on all four longitudinal sides of the elongated cuboid-shaped HD insulating core 50*b*. As further illustrated in FIG. 2B, the opening assembly 100*a* may further include weatherstrips 70*g* and 72*g*.

The insulating member 14*a* includes a high-density (HD) insulating core 20*b* and wood components 22*g*, 24*g*, and 26*g* that are situated on three of the four longitudinal sides of the elongated cuboid-shaped HD insulating core 20*b*. As further illustrated in FIG. 2B, the insulating member 14*a* may be affixed to a house frame 66*g* by screws 62*g* and 64*g*. Note that screw 62*g* penetrates and is partly secured to HD insulating core 20*b*. Because the HD insulating core 20*b* is made of high-density polyurethane foam with substantially uniform density, the screw 62*g* is securely fastened to the insulating member 14*a*.

Note that although only screws 62*g* and 64*g* are illustrated as being vertically screwed into the insulating member 14*a* to attach the insulating member 14*a* of the frame 10*a* to the house frame 66*g*, other screws or nails may be horizontally screwed into the HD insulating core 20*b* of the insulating member 14*a* or the HD insulating core 50*b* of the sash insulating member 38*a* to affix other components such as, for example, an extrusion to the insulating member 14*a* or to the sash insulating member 38*a*. To facilitate this, in various embodiments, both the HD insulating core 20*b* and the HD insulating core 50*b* may be comprised of highly uniform and dense polyurethane foam.

The use of an HD insulating core 50*b* that comprises polyurethane foam with high and uniform density in the sash insulating member 38*a* also provides certain benefits. For example, there may be times when nails or screws may be inserted horizontally into the HD insulating core 50*b*. The uniform structural integrity of the HD insulating core 50*b* may ensure that the nails or screws do not easily dislodge regardless of the angle at which such nails or screws are driven or screwed into the HD insulating core 50*b*.

Figure 1G:
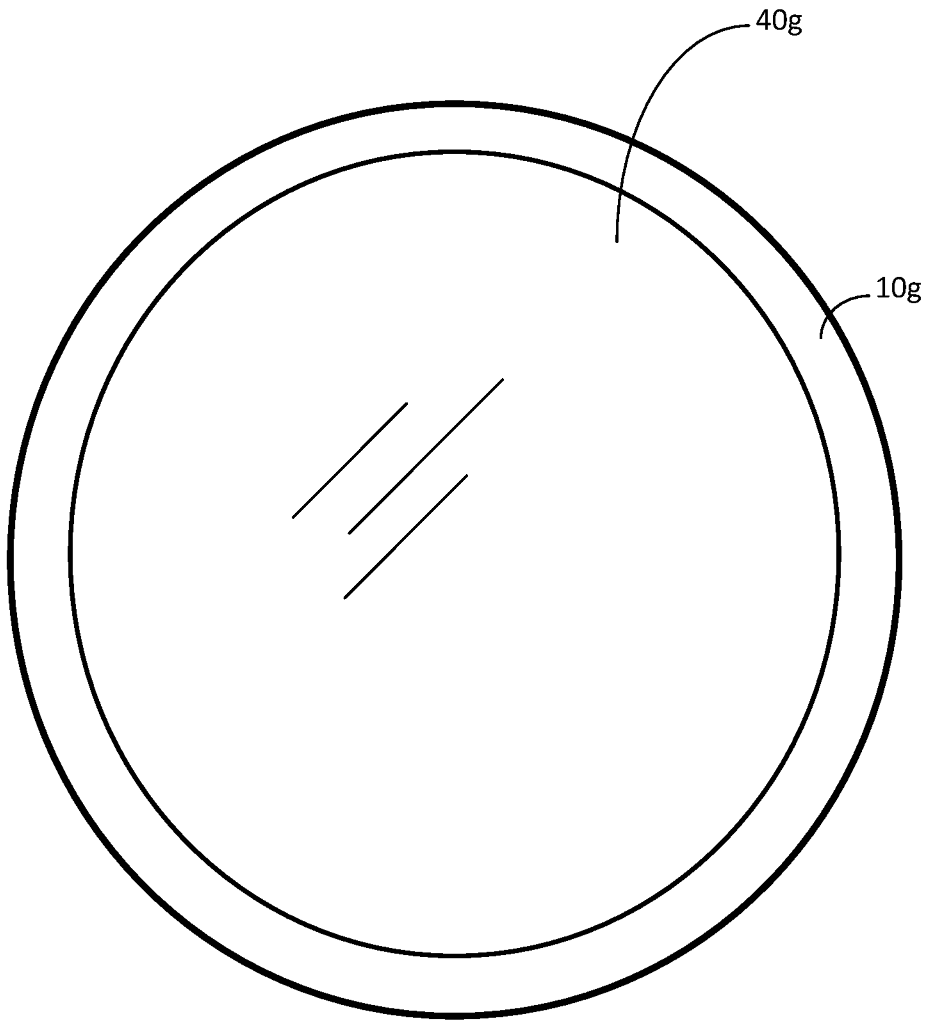
FIG. 1G illustrates an example round sash structure according to some embodiments.

FIG. 1G illustrates an example round window assembly that may incorporate the HD insulating core technology described above according to some embodiments. In particular, the round window assembly 70*g* (hereinafter simply "window assembly 70*g*") in FIG. 1G may be directly affixed into a window opening of a building and may incorporate one or more HD insulating cores (e.g., uniform HD polyurethane cores) along the perimeter of the window assembly 70*g*. For the embodiments, the window for the window assembly 70*g* may be fixed and may not open. The window assembly 70*g* may include a set of one or more glass panes 40*g* and a frame 10*g*. In some cases, the one or more glass panes 40*g* (and an edge sealing member that is not illustrated) may form an IGU. In various embodiments, the frame 10*g* may incorporate one or more HD insulating cores that are at least partially encased by one or more wood components. For example, in some embodiments, the frame 10*g* may comprise a single continuous ringed shaped HD insulating core that is at least partially encased by wood. In alternative embodiments, however, the frame 10*g* may comprise multiple insulating members, each insulating member incorporating an HD insulating core that is at least partially encased by wood.

Although the above-described window and door assemblies were illustrated and described as having rectangular or round shapes, those of ordinary skill in the art will recognize that the above-described HD insulating core technology may be incorporated into assemblies of windows or doors having other shape types. For example, in various embodiments, the above-described HD insulating core technology may be incorporated into the assemblies of windows having other form factors (other than the rectangular and circular shapes described and illustrated above) including, for example, triangular, hexagonal, oval, pentagonal, octagonal, square, trapezoid, cathedral, radiused (curved top), cambered, and so forth.

Figure 3A:
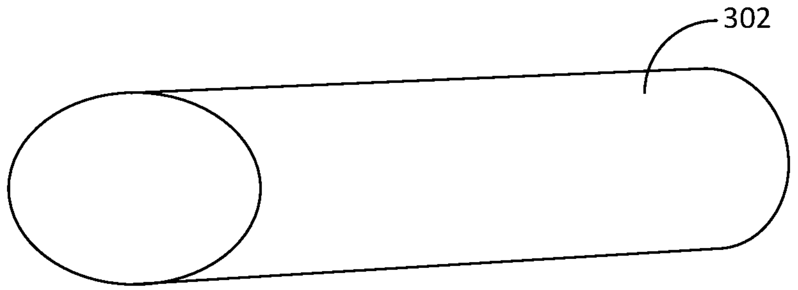
FIG. 3A illustrates an example high-density polyurethane block according to some embodiments.

FIGS. 3A to 3D illustrate different stages or results of different stages of a method for constructing an opening assembly (e.g., opening assembly 100*a* of FIG. 1C) for a building opening according to various embodiments. Note that FIGS. 3A to 3C relate to the formation of an insulating member for a frame or a sash structure. Referring particularly now to FIG. 3A, which illustrates a high-density (HD) polyurethane block 302, which may be provided for forming an HD insulating core for incorporation into an insulating member according to some embodiments. The HD polyurethane block 302, in various embodiments, may be a cured polyurethane block having a uniform density that does not deviate in density by greater than ten percent throughout the block. In some embodiments, the HD polyurethane block 302 may have a density of 20 to 30 pounds per cubic foot, while in other embodiments the HD polyurethane block 302 may have an average density of 25 pounds per cubic foot. In some embodiments, the polyurethane foam of HD polyurethane block 302 may have an R-value of between 1.00 and 7.50 for one-inch thickness. In some embodiments, the polyurethane foam of HD polyurethane block 302 may have an R-value between 2.00 and 4.40 for one-inch thickness. In some instances, the HD polyurethane block 302 may have an R-value of approximately 2.42 for one-inch thickness. In some embodiments, the HD polyurethane block 302 may be a microcellular polyurethane foam having gas bubbles less than 50 microns in size.

Although block 302 is illustrated in FIG. 3A as having an elongated shape, in alternative embodiments, block 302 may have other types of shapes.

Figure 3B:
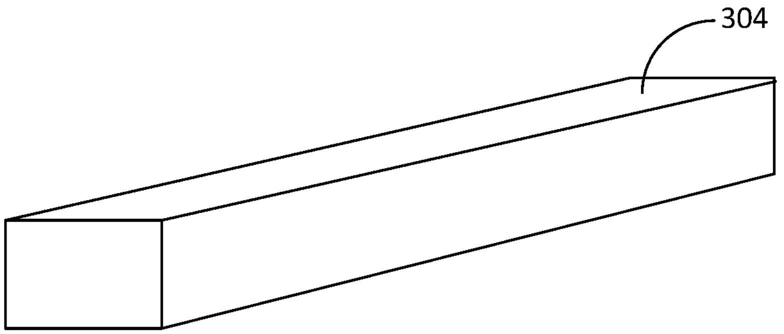
FIG. 3B illustrates a high-density polyurethane core that was produced after the high-density polyurethane block of FIG. 3A is milled according to some embodiments.

In various embodiments, the HD polyurethane block 302 of FIG. 3A may be milled and shaped to form an HD polyurethane core 304 as illustrated in FIG. 3B. The resulting HD polyurethane core 304 may be used for inclusion in an insulating member that may be incorporated into the frame or the sash structure of the opening assembly. In some embodiments, the HD polyurethane core 304 may have an elongated shape with four elongated longitudinal sides, and two opposite end sides that are situated transversely (e.g., orthogonally) with respect to the four longitudinal sides. For example, in some embodiments, the HD polyurethane core 304 may have an elongated cuboid shape as illustrated in FIG. 3B. In alternative embodiments, the HD polyurethane core 304 that is produced by the milling process may have other form factors such as a curved elongated shape with four elongated longitudinal sides, and two opposite end sides that are situated transversely with respect to the four longitudinal sides similar to the cuboid-shaped HD polyurethane core 304 illustrated in FIG. 3B except the elongated shape being curved.

Figure 3C:
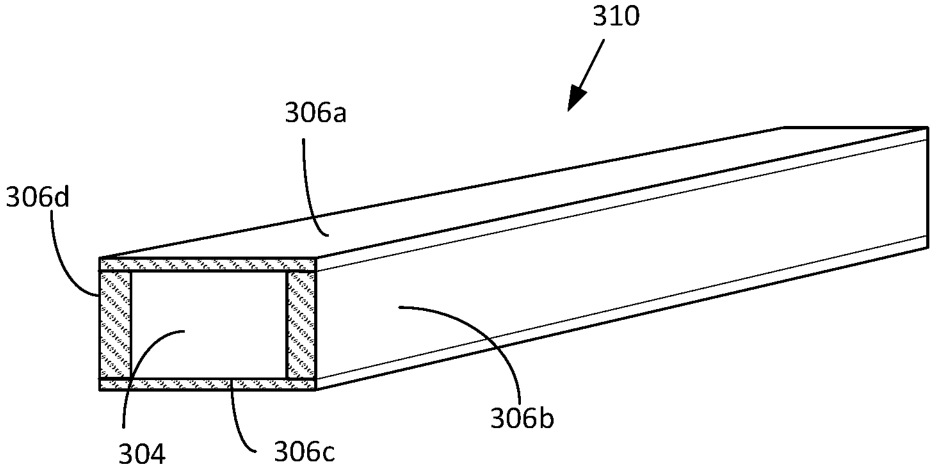
FIG. 3C illustrates four wood components affixed to four longitudinal sides of the high-density polyurethane core of FIG. 3B according to some embodiments.

Next, one or more wood components may be affixed to multiple sides of the HD polyurethane core 304 as illustrated in FIG. 3C to form an insulating member 310 for incorporation into the frame or the sash structure of an opening assembly. FIG. 3C shows wood covering all four longitudinal sides of the elongated cuboid-shaped HD polyurethane core 304. That is, four wood components 306*a*, 306*b*, 306*c*, and 306*d* may be affixed to the four longitudinal sides of the HD polyurethane core 304 by, for example, an adhesive or other means.

In alternative embodiments, three or fewer of the four longitudinal sides of the HD polyurethane core 304 may be covered by wood (e.g., wood component 306*c* is absent). For example, if the insulating member 310 is to be an insulating member for a frame, then only three of the four longitudinal sides of the HD polyurethane core 304 may be affixed with wood (e.g., wood components 306*a*, 306*b*, and 306*d*), such was the case for insulating member 14*a* in FIG. 1B for frame 10*a* of FIG. 1A. However, if the insulating member 310 is to be a sash insulating member (e.g., sash insulating member 34*a* of FIGS. 1C and 1D) for a sash structure, then wood may be affixed to all four longitudinal sides of the HD polyurethane core 304 as illustrated in FIG. 3C.

Note that although FIG. 3C shows four separate wood components 306*a*, 306*b*, 306*c*, and 306*d* affixed to the four longitudinal sides of the HD polyurethane core 304, in alternative embodiments, fewer wood components may be affixed to the longitudinal sides of the HD polyurethane core 304. For example, in some embodiments, wood components 306*a*, 306*b*, and 306*d* may be a single unitary piece, while wood component 306*c* remains a separate component, so that once the HD polyurethane core 304 is inserted into the crevice of the unitary piece, the wood component 306*c* may be affixed to the crevice opening of the unitary piece to at least partially encase the HD polyurethane core 304 in wood.

If the insulating member 310 is for a frame, then the insulating member 310 along with three other similar insulating members may be affixed to each other to form a frame, such as the rectangular frame 10*a* of FIG. 1A. Note that insulating member 310, as illustrated in FIG. 3C, is not meant to be an accurate representation of an actual insulating member such as the insulating members 12*a*, 14*a*, 16*a*, and 18*a* of FIGS. 1A and 1B. That is, for ease of illustration and understanding, all of the wood components 306*a*, 306*b*, 306*c*, and 306*d*, in FIG. 3C are illustrated as having a flat shape. However, in reality, they may have other shape types—see, for example, the second wood component 24*b* of FIG. 1B.

Figure 3D:
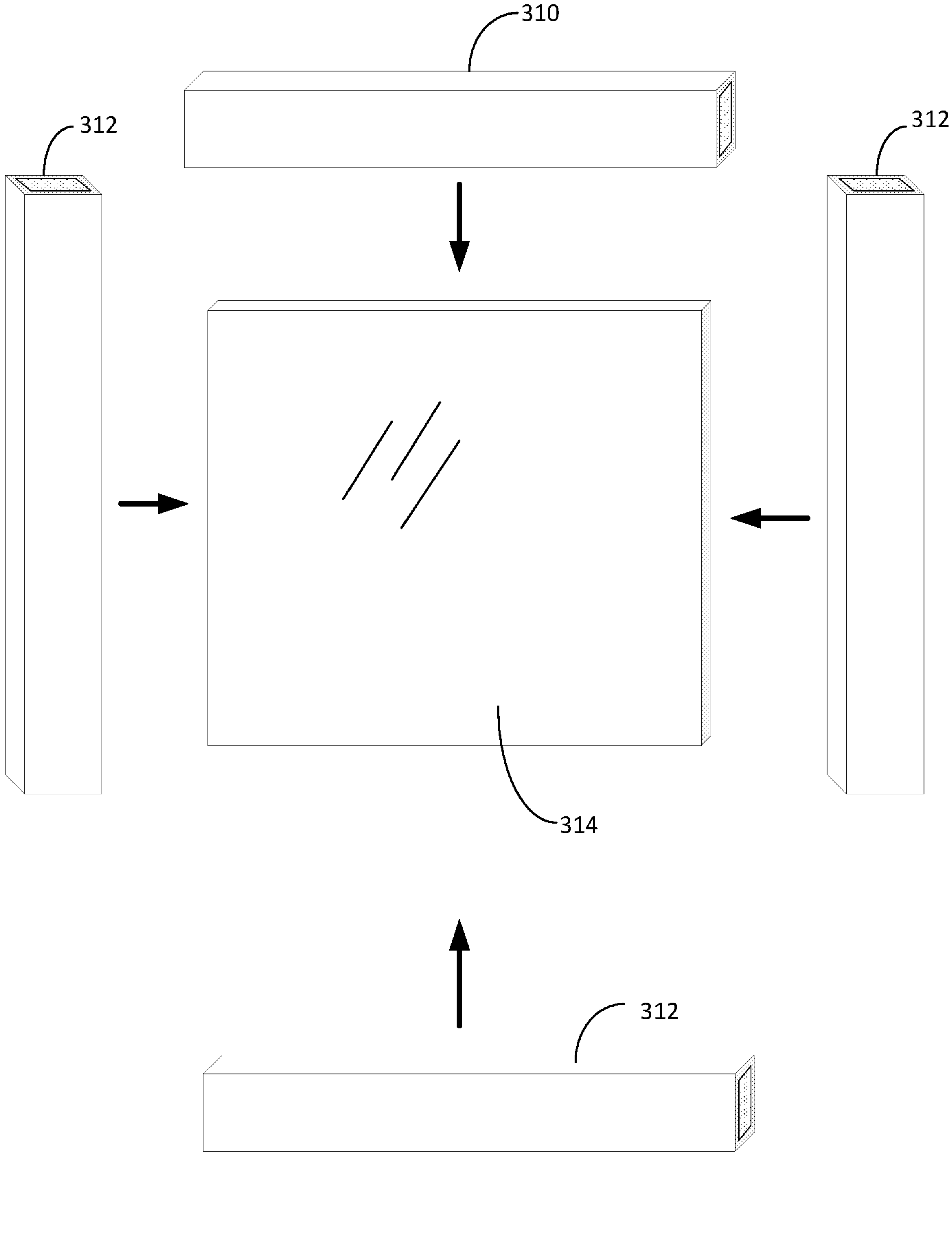
FIG. 3D illustrate representations of insulating members and an insulating glass unit (IGU) that when assembled, forms a sash structure according to some embodiments.

If, on the other hand, the insulating member 310 is a sash insulating member for a sash structure (e.g., sash structure 30*a* of FIG. 1C), then in some embodiments, the insulating member 310 along with three other similar insulating members 312 and an insulating glass unit (IGU) 314 may be assembled and affixed to each other (e.g., via glue or other adhesive) to form a sash structure, such as the sash structure 30*a* of FIG. 3D. Note that FIG. 3D illustrates representations of the insulating members and an IGU that may form a sash structure (e.g., sash structure 30*a* of FIG. 1C) and is not meant to be a true representation of these components.

Once the frame and the sash structure are finished, the sash structure may be affixed to the frame by various means depending on the type of window or door opening assembly being constructed. For example, if the opening assembly being constructed is for a casement type of window, then the sash structure may be affixed to the frame with one or more hinges. On the other hand, if the opening assembly being constructed is for a sliding type of window opening assembly, such as illustrated in FIG. 1E, then the sash structure may need to be intricately installed on the window tracks/rails of the frame. In other cases, if the above process was used to form a frame for a fixed window that does not open, such as the window assembly 70*g* illustrated in FIG. 1G, then the frame that is formed along with the glass pane(s) held by the frame (which may be part of an IGU) can be directly affixed to a building opening.

After reviewing the present disclosure, an individual of ordinary skill in the art will immediately appreciate that some details and features can be added, removed, and/or changed without deviating from the spirit of the invention. Reference throughout this specification to "one embodiment," "an embodiment," "additional embodiment(s)" or "some embodiments," means that a particular feature, structure, or characteristic described in connection with the embodiment(s) is included in at least one or some embodiment(s), but not necessarily all embodiments, such that the references do not necessarily refer to the same embodiment(s). Furthermore, the particular features, steps, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled.

What is claimed is:

1. An opening assembly for a building opening, comprising:

a frame having one or more insulating members, each of the one or more insulating members includes a high-density insulating core, each high-density insulating core having longitudinal sides and being at least partially encased by one or more wood components on at least two opposing longitudinal sides of the high-density insulating core;

wherein the high-density insulating core of each of the one or more insulating members is made of microcellular polyurethane; and wherein the high-density insulating core has a uniform density of microcellular polyurethane foam that does not deviate by greater than ten percent throughout the high-density insulating core.

2. The opening assembly of claim 1, wherein the microcellular polyurethane foam has gas bubbles that are less than 50 microns in size.

3. The opening assembly of claim 1, wherein the longitudinal sides of the high-density insulating core do not mate with a polyurethane insulation layer having a density less than the microcellular polyurethane foam.

4. The opening assembly of claim 1, wherein the high-density insulating core of each of the one or more insulating members has a rectangular cuboid shape with four longitudinal sides and two opposite end sides that are transversely situated relative to the four longitudinal sides, and one or more wood components that are disposed on at least three of the four longitudinal sides.

5. The opening assembly of claim 4, wherein the fourth of the four longitudinal sides of the high-density insulating core of each of the one or more insulating members is at least a portion of an outer surface for the frame.

6. An opening assembly for a building opening, comprising:

a frame having one or more insulating members, each of the one or more insulating members includes a high-density insulating core, each high-density insulating core having longitudinal sides and being at least partially encased by one or more wood components on at least two opposing longitudinal sides of the high-density insulating core;

wherein the high-density insulating core of each of the one or more insulating members is made of microcellular polyurethane; and wherein the microcellular polyurethane foam has gas bubbles that are less than 50 microns in size.

7. The opening assembly of claim 1, wherein the high-density insulating core of each of the one or more insulating members has a density of 10 to 50 pounds per cubic foot.

8. The opening assembly of claim 1, wherein the high-density insulating core of each of the one or more insulating members has an R-value between 2.00 and 4.40 for one-inch thickness.

9. The opening assembly of claim 1, wherein each high-density insulating core of each of the one or more insulating members has a density of 20 to 30 pounds per cubic foot.

10. The opening assembly of claim 1, wherein each high-density insulating core of each of the one or more insulating members has a compressive strength of 300 to 5000 pounds per square inch (psi), a tensile strength of 260 to 4000 psi, a flexural strength of 380 to 6000 psi, and coefficient of thermal expansion (CTE) of 29×10-6/K.

11. The opening assembly of claim 1, wherein the one or more insulating members include four insulating members and the frame having a rectangular shape, the four insulating members placed along four sides of the frame, and the high-density insulating core of each of the four insulating members extending longitudinally from one end side to an opposite end side of a respective insulating member of the four insulating members.

12. The opening assembly of claim 1, further comprising a sash structure having one or more sash insulating members, each of the one or more sash insulating members includes a high-density insulating polyurethane core, each high-density insulating polyurethane core being at least partially encased by one or more wood components on longitudinal sides of the high-density insulating polyurethane core.

13. The opening assembly of claim 12, wherein the high-density insulating polyurethane core of each of the one or more sash insulating members includes microcellular polyurethane foam having gas bubbles that are less than 50 microns in size.

14. The opening assembly of claim 12, wherein the sash structure has a rectangular shape with the one or more sash insulating members arranged along four perimeter sides of the sash structure.

15. The opening assembly of claim 12, wherein the high-density insulating polyurethane core of each of the one or more sash insulating members has a density of 10 to 50 pounds per cubic foot.

16. The opening assembly of claim 12, wherein the high-density insulating polyurethane core of each of the one or more sash insulating members has a density of 20 to 30 pounds per cubic foot.

17. The opening assembly of claim 12, wherein the high-density insulating polyurethane core of each of the one or more sash insulating members has a uniform density of polyurethane that does not deviate by greater than ten percent throughout the high-density insulating polyurethane core.

18. The opening assembly of claim 12, wherein the high-density insulating polyurethane core of each of the one or more sash insulating members has a rectangular cuboid shape with four longitudinal sides and two opposing end sides that are situated transversely with respect to the four longitudinal sides, and one or more wood components on the four longitudinal sides of the high-density insulating polyurethane core of each of the one or more sash insulating members.

19. An opening assembly for a building opening, comprising:

one or more glass panes; and a frame having one or more insulating members, each of the one or more insulating members includes a high-density insulating core, the high-density insulating core of each of the one or more insulating members having longitudinal sides and being at least partially encased by one or more wood components on at least two opposing longitudinal sides of the high-density insulating core;

wherein the high-density insulating core of each of the one or more insulating members is made of microcellular polyurethane foam;

wherein the high-density insulating core of each of the one or more insulating members extends longitudinally from a first end side of each of the one or more insulating members to a second end side of each of the one or more insulating members opposite from the first end side;

wherein the one or more insulating members are arranged in a manner such that the high-density insulating core of each of the one or more insulating members, in combination, form a rectangular high-density insulating core frame that is wider than the one or more glass panes;

wherein the microcellular polyurethane foam has gas bubbles that are less than 50 microns in size; and wherein the high-density insulating core has a uniform density of microcellular polyurethane foam that does not deviate by greater than ten percent throughout the high-density insulating core.

20. A method for making an opening assembly, comprising:

providing a cured high-density polyurethane block, wherein the cured high-density polyurethane block is a microcellular polyurethane foam;

milling the cured high-density polyurethane block to form a high-density polyurethane core, the high-density polyurethane core having four longitudinal sides and two opposing sides transversely situated relative to the four longitudinal sides; and affixing at least three of the four longitudinal sides with one or more wood components;

wherein the microcellular polyurethane foam has gas bubbles that are less than 50 microns in size; and wherein the high-density insulating core has a uniform density of microcellular polyurethane foam that does not deviate by greater than ten percent throughout the high-density insulating core.

* * * * *